(12) United States Patent
Jordan et al.

(10) Patent No.: US 11,079,512 B2
(45) Date of Patent: Aug. 3, 2021

(54) SYSTEM AND METHOD FOR ANALYSIS OF FISSIONABLE MATERIALS BY MULTISPECTRAL ACTIVE NEUTRON INTERROGATION ANALYSIS

(71) Applicant: University of Florida Research Foundation, Inc., Gainesville, FL (US)

(72) Inventors: Kelly A. Jordan, Gainesville, FL (US); Jason M. Lewis, Pittsburgh, PA (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 236 days.

(21) Appl. No.: 16/296,588

(22) Filed: Mar. 8, 2019

(65) Prior Publication Data

US 2020/0025969 A1   Jan. 23, 2020

Related U.S. Application Data

(62) Division of application No. 15/111,920, filed as application No. PCT/US2015/011700 on Jan. 16, 2015, now Pat. No. 10,247,847.

(60) Provisional application No. 61/928,249, filed on Jan. 16, 2014.

(51) Int. Cl.
*G01V 5/00* (2006.01)

(52) U.S. Cl.
CPC .................. *G01V 5/0091* (2013.01)

(58) Field of Classification Search
CPC ......... G01V 5/0091; G01T 3/00; G01T 3/006; G01T 3/06; G01N 23/005; G01N 23/2206; G01N 23/22

USPC .................................................. 376/154, 257
See application file for complete search history.

(56) References Cited

U.S. PATENT DOCUMENTS

2005/0220247 A1* 10/2005 Ruddy ................. G01V 5/0091
                                                                    376/159
2009/0074128 A1*  3/2009 Bertozzi ............. G01V 5/0091
                                                                    376/170

OTHER PUBLICATIONS

Hall, "The Nuclear Car Wash: Neutron interrogation of cargo containers to detect hidden SNM", Nuclear Instruments and Methods in Physics Research Section B: Beam Interactions with Materials and Atoms 261, No. 1-2 (2007): 337-340. (Year: 2007).*

* cited by examiner

*Primary Examiner* — Jack W Keith
*Assistant Examiner* — Daniel Wasil
(74) *Attorney, Agent, or Firm* — Thomas | Horstemeyer, LLP

(57) ABSTRACT

The detection and assay of fissionable material is carried out on a container known or suspected to have a material with at least one fissionable isotope. The material is irradiated with neutrons from two or more different neutron sources. The fission rates inducted at each irradiation energy are acquired with at least one neutron detector. A multispectral active neutron interrogation analysis (MANIA) is carried out to compare the detected fission rates of the neutron spectra with calculated fission rates where an iterative algorithm is carried out on a system of linear equations to solve for the isotopic composition of one or more isotopes to determine the presence, identity, and quantities of fissionable isotopes in said container.

12 Claims, 5 Drawing Sheets

SYSTEM AND METHOD FOR ANALYSIS OF FISSIONABLE MATERIALS BY MULTISPECTRAL ACTIVE NEUTRON INTERROGATION ANALYSIS

CROSS REFERENCE TO RELATED APPLICATIONS

This application is a divisional of co-pending U.S. Non-Provisional application Ser. No. 15/111,920, filed Jul. 15, 2016, which is the U.S. national stage application of International Patent Application No. PCT/US2015/011700, filed Jan. 16, 2015, which claims the benefit of U.S. Provisional Application Ser. No. 61/928,249, filed Jan. 16, 2014, the disclosures of which are hereby incorporated by reference in their entireties, including all figures, tables and drawings.

BACKGROUND OF INVENTION

Nuclear Security involves knowledge of the presence of nuclear explosives, materials that can be employed in their fabrication, and materials that can be employed in what has become known as a "dirty bomb" where radioactive material is combined with conventional explosives which can spread radioactive material over a significant area. To this end it is important to improve portal monitoring for detection of illicit nuclear material in cargo containers. Radiation portal monitors (RPMs) are designed to be used at road, rail, airport or seaport checkpoints to detect gamma and neutron radiation from radioactive and nuclear materials. RPM are a preferred option where the traffic of goods can be funneled into narrow confines, typically referred to as nodal or choke points. The sensitivity of detectors needs to be high and the detection data needs to be collected rapidly and analyzed in a sufficiently rapid manner that commerce is not seriously impeded. The monitoring device must be suited to the application and positioned for collection of data exclusively from the container of interest. In addition to detection of radiation, it is desirable to identify the radio isotope source of the radiation. X-ray techniques do not readily distinguish between fissionable nuclear materials and innocuous high-Z materials like lead or tungsten that are legitimate cargo. Gamma spectroscopy is not always effective since many materials of interest are not highly radioactive and are easily shielded. Yet, typical identification is carried out by measurement of the gamma spectrum to identify a radionuclide. This is complicated if the radiation source is a mixture of radionuclides. Identification requires an effective algorithm to analyze the convoluted gamma spectrum, as reviewed in Burr et al., *Algorithms* 2009, 2, 339-360. Identification is essential to categorization of the event and determination of the appropriate response to the event. Appropriate isotopes must have half-lives, on the order of hours, and intermediate energies, between 250 and 1400 keV, and a measurement time of approximately one day is required to produce reaction rate uncertainties on the order of 2%.

There are many challenges to be overcome in the screening for threat isotopes; not the least of which is that there are approximately 200 radioisotopes. The radioisotopes can belong to: medical isotopes, such as $^{67}$Ga, $^{51}$Cr, $^{75}$Se, $^{99m}$Tc, $^{103}$Pd, $^{111}$In, $^{123}$I, $^{125}$I, $^{131}$I, $^{201}$Tl, and $^{133}$Xe; industrial isotopes, such as $^{57}$Co, $^{60}$Co, $^{133}$Ba, $^{137}$Cs, $^{192}$Ir, $^{204}$Tl, $^{226}$Ra, and $^{241}$Am; naturally occurring radioactive material (NORM) isotopes, such as $^{40}$K, $^{226}$Ra, $^{232}$Th and its daughters, and $^{238}$U and its daughters; and special nuclear material (SNM) isotopes, such as $^{233}$U, $^{235}$U, $^{237}$Np, and Pu isotopes. There is no accurate figure concerning the number of radioactive material sources throughout the world. In addition to power plants, where the fuels and wastes contain Uranium 235 and Plutonium 239 among other isotopes, there are many uses that employ the radioisotopes Cobalt 60, Strontium 90, Cesium 137, and Iridium 192, and the sheer number of applications for these materials make them inherently difficult to track and control. Many of these materials are lost, stolen, or simply abandoned when no longer required; for example, an average of about 300 sources of radioactive material are reported lost or stolen each year in the United States. These "orphaned" radioactive sources are an immense concern and even more troublesome are sources from countries where civil authority and regulatory oversight are weaker.

Scanning rail cargo and other broadly distributed moving containers is a significant challenge with many differences from standard cargo container scanning that can be carried out with stationary containers. This screening requires rapidly determining the presence of nuclear material in a moving rail car. Methods that can readily perform such screening generally require the disruption of commerce.

Another problem involves the waste stream assessment and environmental processing systems employed during the decommissioning of nuclear facilities, power plants, and weapons complexes where materials must be assessed for contamination. An effective and rapid assessment method to distinguish non-contaminated from contaminated material, as well as determining fissile contamination across large environmental areas is needed.

Spent fuel assay, particularly plutonium assay and cask storage verification, is an important goal in nuclear safeguards to verify quantities of fissile material in spent fuel to ensure that no material has been illicitly diverted for the production of weapons. Current spent fuel safeguards techniques are passive, showing only that the spent fuel has not been removed and do not characterize the spent fuel. Current techniques rely on computer codes and passive measurements of the spent fuel. Current Pu assay techniques are not able to accurately determine the Pu mass in spent fuel. Several reports have concluded that a combination of assay techniques is needed to get the desired accuracy. More complete and accurate analysis of the spent fuel would improve the safety margin and arrangement of spent fuel in dry storage by allowing the determination of the number and arrangement of spent fuel in a dry cask when transferring fuel from pool to dry storage. An improved method of analysis could explicitly identify and characterize spent fuel bundles to discourage fuel pin/bundle diversion. Direct measurements made from an active interrogation of the spent fuel to determine the composition of the fuel to permit recording of the bundle's signature would be useful. Such an assessment of spent nuclear fuel would aid in criticality calculations and potentially reduce the cost of dry storage of spent fuels or help ensure that no nuclear material is diverted during a reprocessing of the spent fuel. A system that could be integrated with other techniques to improve and assure the accuracy of the assay and determine Pu content is needed.

Nuclear fuel enrichment facilities require non-destructive monitoring of enrichment and flow for both process monitoring and treaty/safeguards compliance. Non-destructive assay (NDA) of spent nuclear fuel with a direct and independent determination of plutonium (Pu) mass in spent fuel is increasingly important for international safeguards.

Rather than employing passive detection, active approaches to detection have been promoted by using probing beams, such as a neutron beam. The nuclear material of fuels can be probed by irradiation in a test reactor or by irradiation using an external neutron source. After irradiation the gamma spectrum is measured and specific gamma lines are correlated to the induced reaction rates. Chosen fission products must have half-lives on the order of hours and intermediate energies, between 250 and 1400 keV. This method requires measurement time of about one day to produce reaction rate uncertainties on the order of 2%. Unfortunately, the high irradiation background from spent fuel prevents using of the conventional gamma-scanning method to measure its fission rate.

A high-energy delayed gamma technique developed for spent fuel involves modifying the existing gamma-scanning method by using high-energy lines from delayed gamma precursors (above 2 MeV), which can be measured above the background after neutron interrogation. This technique is hampered by the poor-quality nuclear data associated with the high energy gamma lines. Even with measurements over several hours, the random uncertainty on induced fission rates is several percent and there are systematics contributions that also add several percent to the uncertainty.

An alternative is a technique that uses delayed neutron measurements. Delayed fission neutrons are induced by the interrogator source, which are measured with the passive neutron emission treated as a background, although doing so increases the statistical uncertainty of the measurement. Typically, 1-2 minutes of measurement data can be obtained for each 15 minute irradiation period, which is the time required for saturation of delayed neutron precursors, with the achievement of random uncertainties of 2% for a series of measurements. Systematic uncertainties can contribute up to 5% additional uncertainty.

Discrimination between probing neutrons and fission induced prompt neutrons is often very difficult, particularly when the energy of the probing neutrons is similar in energy to that of the more energetic prompt neutrons generated or when large containers are involved. Alternative techniques induce fission events with pulsed external neutron sources and detect the much weaker delayed neutron emission from fission products to distinguish the induced signal from the probing neutrons. More recently, Betozzi et al., U.S. Pat. No. 8,358,730 teaches a method to identify actinide nuclear materials by analyzing energetic prompt neutrons after neutron induced fission with lower energy incident neutron where a plurality of detectors is placed at different angles relative to the incident neutron beam. The method could identify an actinide by the energy distribution change upon irradiation with a second incident neutron. There is no apparent teaching of discerning the composition of a mixture of fissionable materials.

Hence, there remains a need for a relatively rapid method to inventory the components of a radioactive material for control of nuclear materials.

BRIEF SUMMARY

Embodiments of the invention are directed to a method of assaying fissionable material where a material comprising at least one fissionable isotope is sequentially irradiated by a plurality of incident neutron energies from different neutron sources an acquiring a fission rate induced in the material at the incident neutron energies using at least one detector, from which a multispectral active neutron interrogation analysis (MANIA) is performed where the fission rates determined from the neutron spectra are compared to calculated fission rates for isotopic compositions of at least one isotope by an iterative algorithm using a system of linear equations to determine the identities and quantities of fissionable isotopes in the material are determined. The neutron sources can be from a D,D generator, a D,T generator, a radioisotope source, or a nuclear reactor. The neutron detector can be a $^4$He gas scintillation detector. The MANIA involves inputting the geometry of irradiation and the detected fission rates and carrying out an iterative calculation and comparison by: inputting anticipated fissionable isotopes in the material as a test fissionable isotope composition; calculating expected fission rates for the test fissionable isotope composition; checking for convergence of the expected fission rates to that of the detected fission rates; and outputting the identities, and quantities of fissionable isotopes in the material if the expected fission rates and said detected fission rates are effectively equal or calculate effective cross-sections and use adjust the test fissionable isotope composition from the cross-section and repeat steps of checking for convergence of the expected and detected fission rates.

DETAILED DISCLOSURE

Embodiments of the invention are directed to a non-destructive method of analyzing containers housing fissionable nuclear materials. The nuclear materials can be a single isotope or can be a mixture of isotopes where the composition of isotopes can be determined to a high degree of confidence. The contained materials can be processed nuclear fuels, spent nuclear fuels, or containers that need to be analyzed as a potential threat to a populated area or its infrastructure. The method uses a plurality of neutron generators with at least one neutron detector. The method involves a multispectral active neutron interrogation analysis (MANIA) where the fission rates of a nuclear sample induced by several different incident neutron energies is compared with multiplicity of fission rates from simulated fission rates such that the solution to a system of linear equations can be solved for the isotopic composition of one or more isotopes. The MANIA method employs an iterative method to account for self-shielding on the measured fission rate where a Monte Carlo N-particle transport (MCNP) model is employed for the irradiation geometries and materials to produce simulated fission rates for compositions that is used to compare with the measured fission rates. The MCNP cross-section is updated in the iterative process until the MCNP simulated fission rate converges with the measured fission rate to permit the assignment of the isotope composition.

In an embodiment of the invention, the neutron source can be from a plurality of neutron sources. In other embodiments of the invention, the neutron source can be: from a reactor, where analysis is at the site of a reactor; a radioisotope source, such as a $^{241}$AmLi(a,n)$^{10}$B source, where safety, logistical, and security needs can be met; or accelerator-based neutron sources can be used, including other compact light-ion accelerator generators such as a D,D generator where the generated neutrons are of an energy of ~2.5 MeV and a D,T generator for neutrons with an energy of ~14.1 MeV.

This MANIA numerical algorithm involves comparing fission rates produced by irradiating a nuclear material sample with a plurality of neutron generators for irradiation at several different neutron energies to generate a series of linear equations that is solved for the isotopic composition of the nuclear material. Part of the algorithm overcomes the complicated effects of neutron self-shielding by comparing measured fission rates to results from an s simulation and iterating until they converge.

Figure 1:
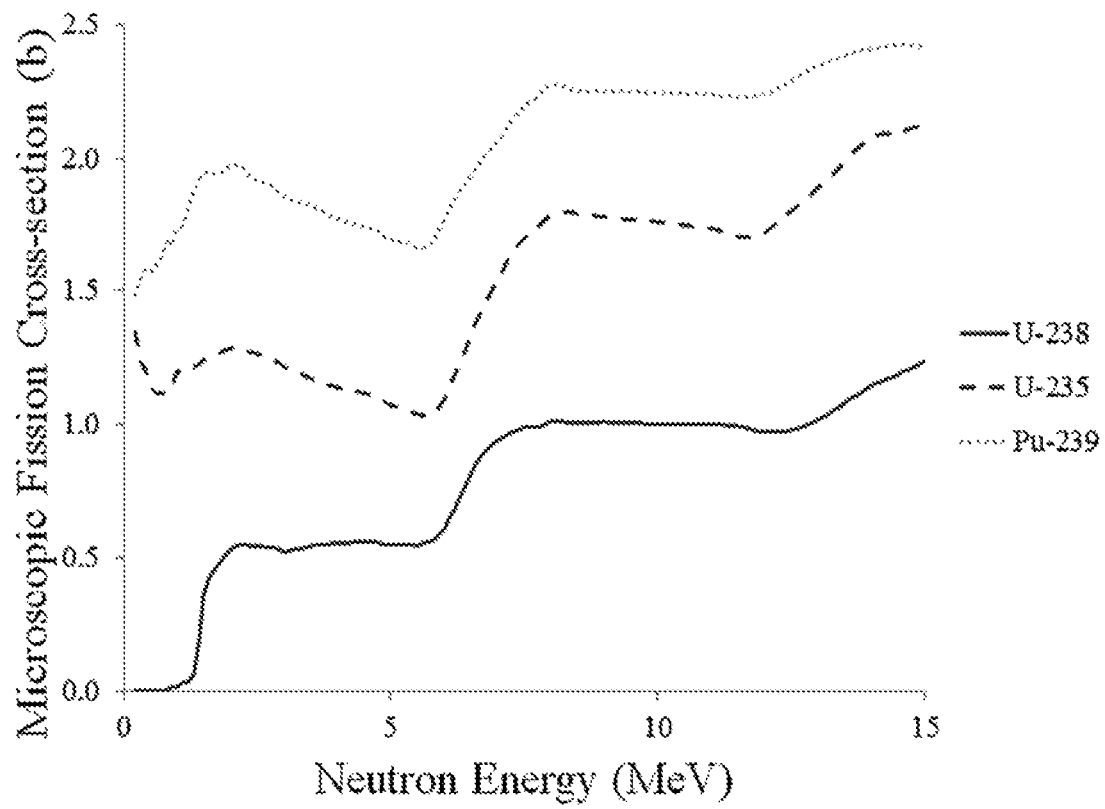
FIG. 1 shows a composite plot of the fission cross section for $^{235}$U, $^{238}$U, and $^{239}$Pu from 200 keV to 15 MeV.

This MANIA method accurately accounts for self-shielding in the fuel sample by using relatively low energy neutron generators and relying on higher energy incident neutron nuclear data. The different fission cross sections recorded allow calculation of a unique fission rate for a specific isotopic composition and incident neutron energy. FIG. 1 shows the variation in fission cross section over a range of energy for three common isotopes in a nuclear material sample that simulates a spent fuel.

Fission rate (F) measured at different neutron energies gives rise to a system of linear equations in the form of Equation (1) that is solved as an inverse problem for unknown masses (N) of the fissionable materials where the total fission rate of an unknown sample is a linear combination of the isotopic components. The number of equations, i, is determined by the different interrogating neutron energy and j is the number of unknown fissionable isotopes. A matrix of microscopic cross sections, A, is generated where i is the i-th energy and j is the j-th fissile isotope with each row multiplied by the flux, $\phi_i$ to create macroscopic cross sections. Solving the inverse problem for N cannot be performed by simply inverting the A matrix and multiplying because the ill-conditioned nature of the A matrix causes small errors in values of the F vector to be magnified significantly. Once self-shielding becomes significant, flux varies throughout the sample and, therefore, the simple inverse relation cannot produce accurate results. Neutron multiplication in the sample is not accounted for by a simple inverse. These difficulties are overcome as given below.

$$\Lambda_{i,j} N_j = F_i \tag{1}$$

where, $$F = N_f \sigma_f \phi = \phi(N_1 \sigma_1 + N_2 \sigma_2 \ldots N_N \sigma_N) = \phi \sum_j^N N_j \sigma_j \tag{2}$$

and $$\begin{bmatrix} \phi_1(\sigma_{i,j} & \ldots & \sigma_{1,N}) \\ \vdots & \ldots & \vdots \\ \phi_M(\sigma_{M,1} & \ldots & \sigma_{M,N}) \end{bmatrix} \begin{bmatrix} N_1 \\ \vdots \\ N_N \end{bmatrix} = \begin{bmatrix} F_1 \\ \vdots \\ F_M \end{bmatrix}. \tag{3}$$

A convex optimization numerical algorithm is used to solve (1) by modeling it as (4). This algorithm applies constraints that permit calculation by a least squares fit of the resulting vector.

$$\text{Minimize} \|\Lambda N - F\|_2 \tag{4}$$

This optimization method reduces the effect that small errors on $\Lambda$ have on the resulting solution vector and provides a least squares solution to $\Lambda$ when N and F are known.

Figure 2:
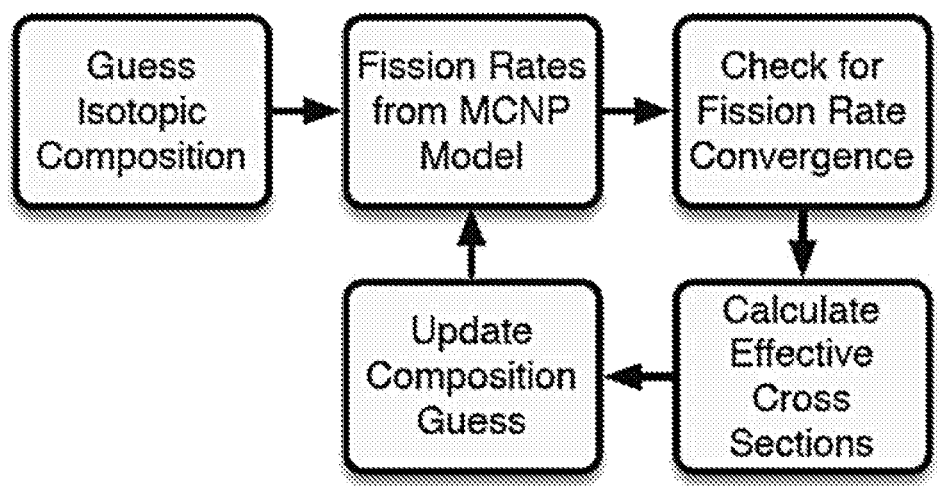
FIG. 2 is an iteration diagram for employing the MCNP model to compensate for the effects of self-shield on the overall fission rate in a sample, while determining the presence and identity of fissionable isotopes, according to an embodiment of the invention.

An iteration method is used and the A matrix of an unknown isotope composition. Self-shielding by the fuel during irradiations causes large errors for which it is difficult to create analytical expressions. To account for the self-shielding on the measured fission rate an MCNP model of the irradiation geometry and materials is generated to produce simulated fission rates for comparison. MCNP allows for three dimensional modeling of the actual experimental setup that includes the neutron source and interrogated sample, permitting the accurate determination of fission rates induced in a sample that includes the effects of self-shielding. The iterative process is shown in FIG. 2 where an initial guess for the isotopic composition of the unknown sample is made.

Self-shielding effects are assumed to cause lower effective fission cross sections for all isotopes at all energies. An initial guess of the isotopic composition is used in the MCNP model of the irradiation geometry to determine an expected fission rate for that composition for comparison with the measured fission rates. The simulated fission rates are compared to the measured fission rates and if the simulated rates have converged with the measured rates, the correct composition is assigned. If convergence has not occurred, the isotopic composition and fission rates from the MCNP simulation is modeled as a convex optimization problem and equation (8) is used determine a least squares solution for the effective cross sections matrix A, of the isotopes at each irradiation energy level with constraints (5), below.

$$\Lambda \geq 0.0, (\Lambda_{Real} - \Lambda) \geq 0 \tag{5}$$

The constraints are set with the effective cross sections being greater than zero but less than the actual cross sections for each material and irradiation energy. When the effective cross sections for the MCNP model are determined, (4) is repeated with the fission rates of the nuclear material sample and the calculated effective cross sections to obtain an updated guess for the isotopic composition (N). This convex problem is constrained such that each isotopic weight fraction is greater than zero and the sum of the isotopic fractions is equal to unity. The updated isotopic fractions are used in the MCNP simulation to produce simulated fission rates for which convergence is tested. This iterative process is continued until the unknown fission rates converge to the simulated rates.

To determine the weight percentage of each isotope an approximation of the neutron flux in the sample is determined. Equation (6), below, for the isotopic fraction for each isotope, is an equation for atom density of each component in a mixture. Using this with the first part of equation (2) leads to equation (7), below, for calculating the weight percent of each isotope with the assumptions that the differences in atomic weights $M_j$ are small and the flux is approximated as a homogeneous mixture of materials to allow the flux and other constants of equation (7) to be combined as a constant C, as the small differences in flux and atomic weight are accounted for in $\Lambda_{ij}$. The value for C is determined for any geometry by a MCNP model of the geometry and iterating expected fission rates for a known isotopic composition over a range of values for C and determining areas of convergence.

$$N_j = \frac{w_i \rho N_A}{M_j} \quad (6)$$

$$w_j = \frac{N_j M_j}{\rho N_A \phi_i} = C N_j \quad (7)$$

Equation (5) does not account for additional fission rate generated by the fission neutrons created from the incident flux, which are included in the experimentally measured fission rates. Therefore, a correction factor for the multiplication of neutrons is determined. An MCNP simulation is run without fission neutrons using the NONU card. During an iteration, two MCNP simulations are executed, one to determine an expected fission rate with multiplication from fission neutrons (F) and one without fission multiplication ($F_{NONU}$) at each energy. The ratio of the simulated fission rates is a subcritical multiplication factor (m) of the sample and is determined for each interrogation source energy.

$$\frac{F}{F_{NONU}} = m \quad (8)$$

There is a unique m at each of the irradiation energies. The unknown fission rates are multiplied by m and the minimization equation becomes (9) when solving for N.

$$\text{Minimize} \left\| \Lambda N - \frac{1}{m} F \right\|_2 \quad (9)$$

In another embodiment of the invention a

Methods and Materials

A Python script was created to automate the iteration process and perform all calculations. Initial testing of a model and iteration scheme consisted of an MCNP model of an isotropic point source irradiation of a fuel sample. The algorithm was tested with different fuel sample geometries, starting conditions, and isotopic compositions. The different geometries and dimensions, isotopic composition, and irradiation energies are given in Table 1, below. The isotopic composition was chosen to easily distinguish the isotopic composition upon convergence on the weight percent of each isotope. Irradiation energies were chosen as characteristic neutron energies produced by neutron generators and a well characterized spectrum of energy. Fission rates in each geometry were calculated with the MCNP model for each irradiation energy and used as the 'unknown sample fission rates' input into the iteration algorithm. Due to self-shielding effects, an initial guess at isotopic composition using known fission cross sections for each isotope at each energy was not accurate, requiring performing the iteration process. Ten iterations for each variation were completed for comparisons between final results.

TABLE 1

Different Geometries and Dimensions Tested with Given Isotopic Composition and Irradiation Energies

| Shape | Dim 1 (cm) | Dim 2 (cm) | Source Loc. | Isotope | w/o | Energy |
|---|---|---|---|---|---|---|
| Cylinder | H = 9, D = 1.5 | H = 9, D = 4 | ⊥ to H | $^{238}$U | 70% | 2.5 MeV |
| Plate | 9 × 9 × 1.5 | 9 × 9 × 4 | ⊥ Large Surface | $^{235}$U | 5% | 14 MeV |
| Cubic Shell | 9 × 9 × 9 T = 1.5 | 9 × 9 × 9, T = 4 | Center Shell | $^{239}$Pu | 25% | AmLi Spect |

Figure 3:
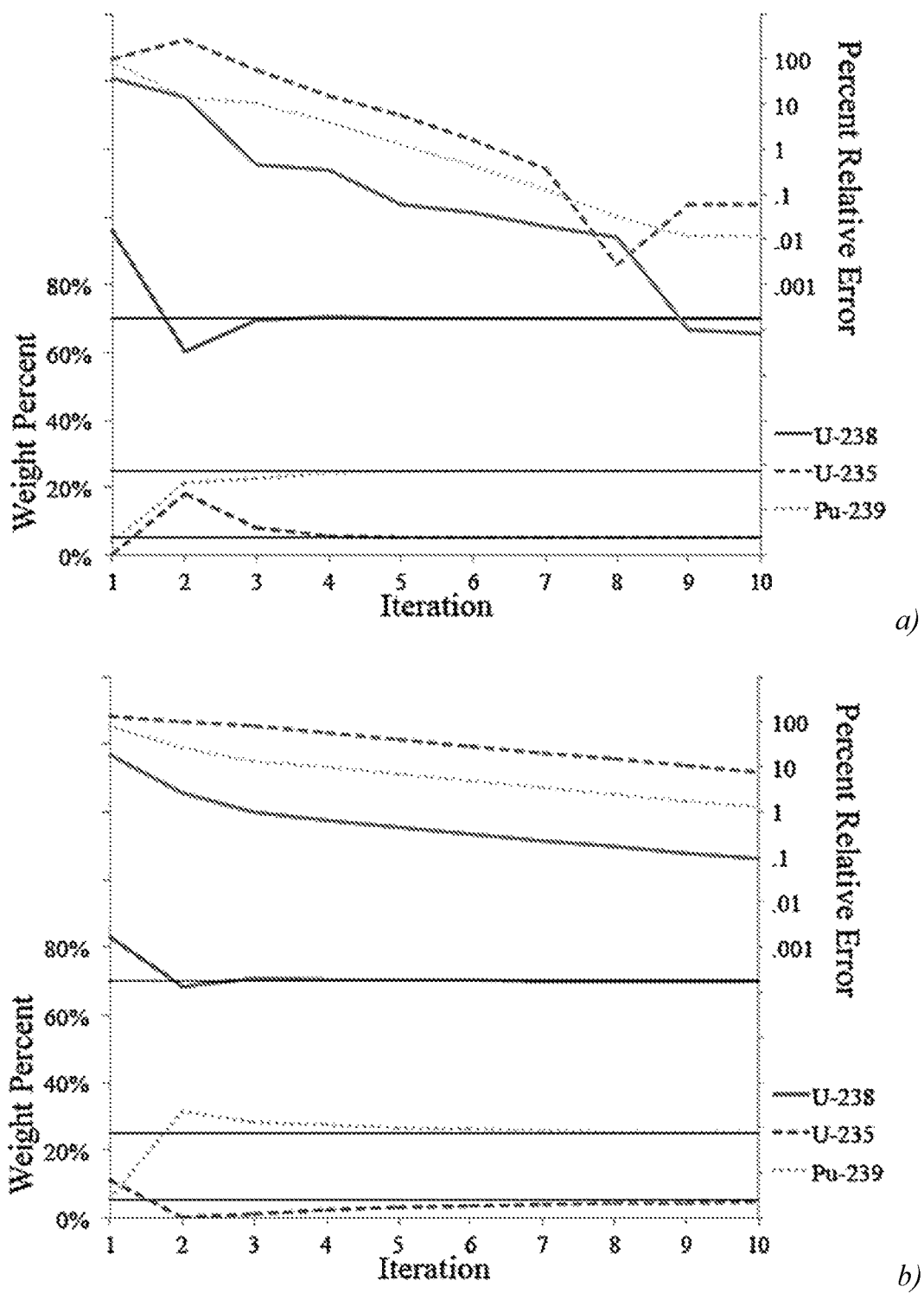
FIG. 3 shows plots of the isotopic composition in weight percent and the percent relative error over 10 iterations for the cylinder samples of Table 1 for a) dimension 1 and b) dimension 2, according to an embodiment of the invention.
Figure 4:
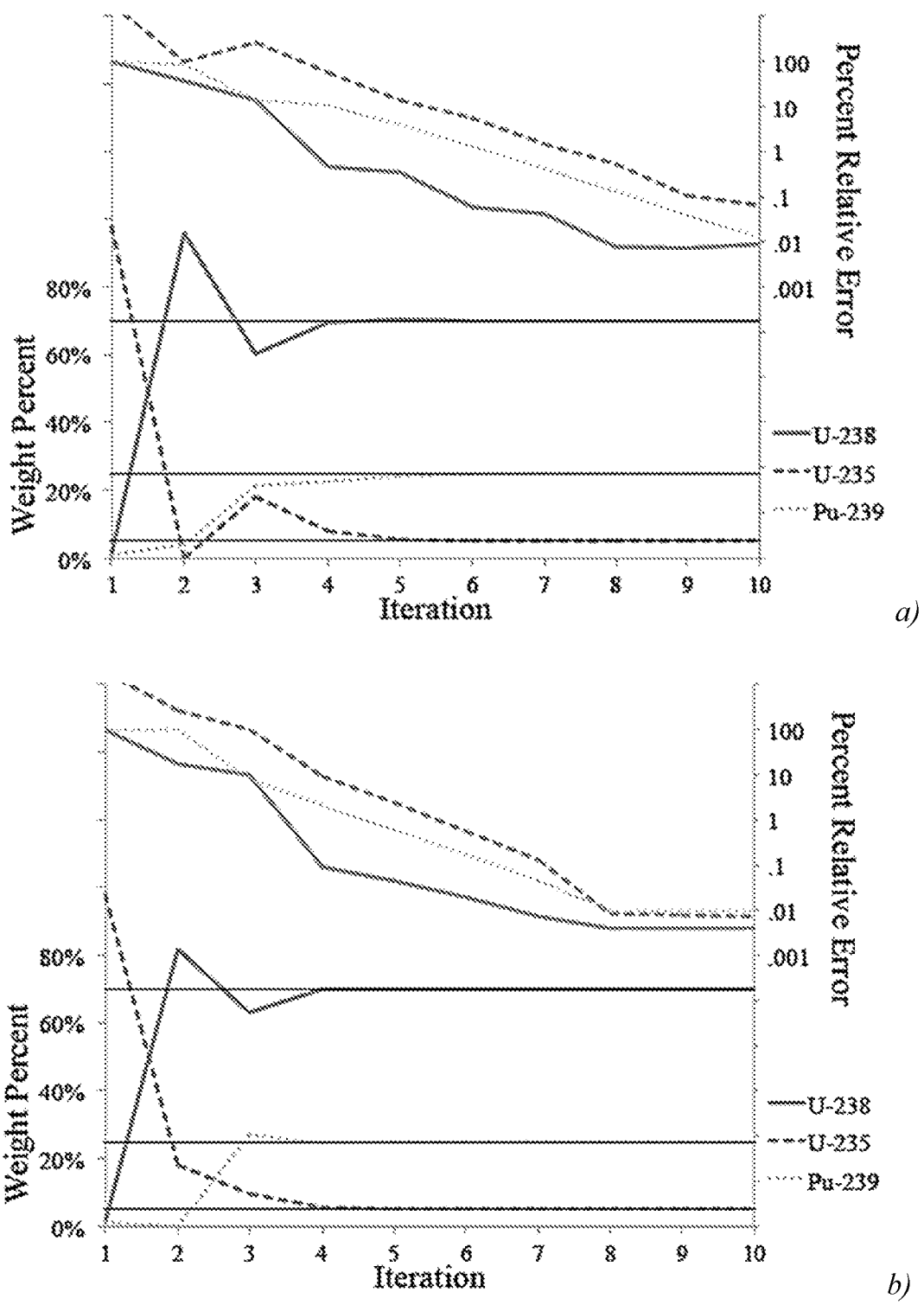
FIG. 4 shows plots of the isotopic composition in weight percent and the percent relative error over 10 iterations for a) cylinder and b) plate samples having dimension 1 of Table 1 where an intentionally poor initial isotopic guess was entered into the algorithm, according to an embodiment of the invention.

Results for the cylinder geometry of Table 1 and dimension are shown in FIG. 3 with the relative error of guessed isotopic composition above the weight percent of isotopes per iteration. All trials converged to nearly the correct answer in 10 iterations, with the exception of the wt % of the $^{235}$U isotope of the thick cylinder that was not within 2% relative error after 10 iterations but was within 1% after 15 iterations. Each trial was completed in less than 10 minutes using a standard IntelR Core™ i5 dual core processor, with the vast majority of computation time being the MCNP simulation. The initial isotopic composition guess was determined using equation (8) with the ENDF VII fission cross section values for each isotope at each energy and the "unknown fission" rates. The initial guess for the isotopic composition is revealed to be quite inaccurate. Trials for each geometry with dimension 1 were run to illustrate the robustness of this algorithm with a particularly poor initial guess. FIGS. 8 and 9 illustrate the algorithm's capability to overcome a poor composition guess and determine a correct isotopic composition. Hence, the algorithm can overcome problems caused by self-shielding of the neutron flux, as it is able to determine the isotopic composition of an irradiated sample with various geometry, dimensions, and starting conditions without a derived self-shielding factor.

A modified algorithm was used to calculate weight percent of the fissionable oxides of isotopes with Gadolinium (Gd) added to probe the algorithm's ability to overcome effects of a strong neutron absorber. Table 3, below, gives the isotopic composition and irradiation energies employed in the calculations. The cylinder geometry with dimension 1 was chosen because this geometry has dimensions similar to a fuel pin. FIG. 10 shows the results of the trial, where, to achieve relative error for all isotopes below 2%, 20 iterations were required.

Figure 5:
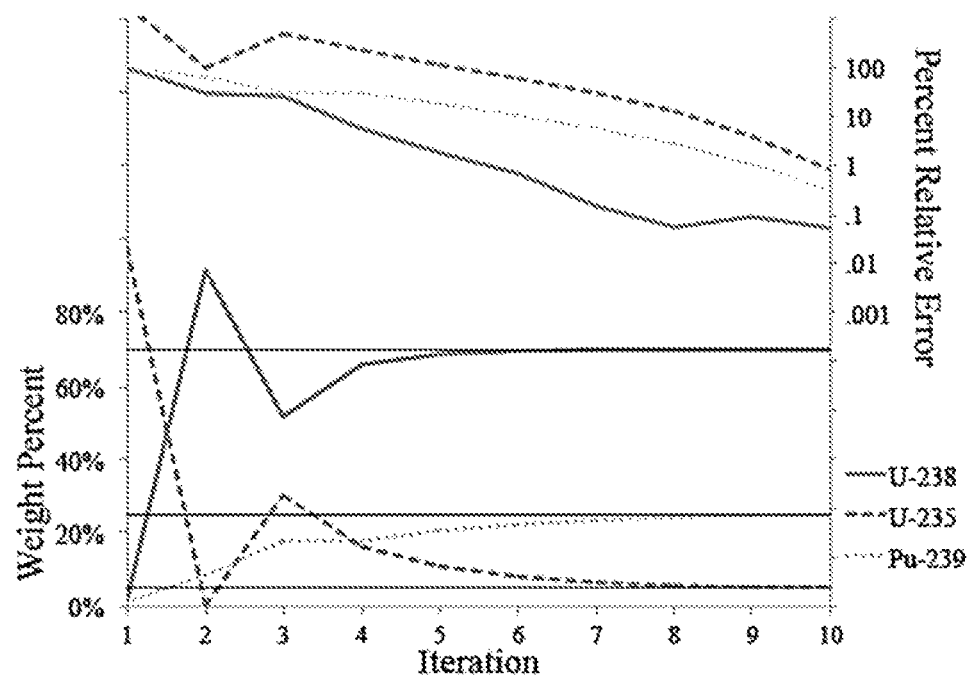
FIG. 5 shows plots of the isotopic composition in weight percent and the percent relative error over 10 iterations for a cubic shell sample having dimension 1 of Table 1 where an intentionally poor initial isotopic guess was entered into the algorithm, according to an embodiment of the invention.
Figure 6:
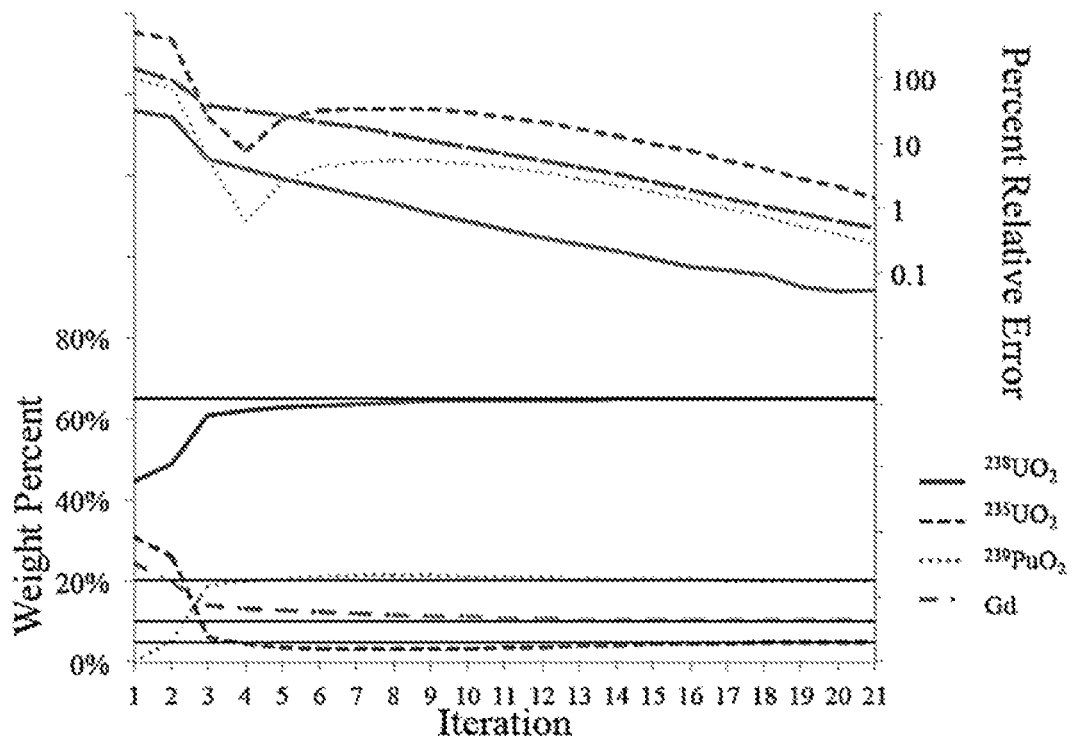
FIG. 6 shows plots of the isotopic composition in weight percent and the percent relative error over 21 iterations for a cylinder sample having dimension 1 of Table 1 where an isotopic composition of oxides with a strong neutron absorbing component Gd employing the algorithm, according to an embodiment of the invention.
Figure 7:
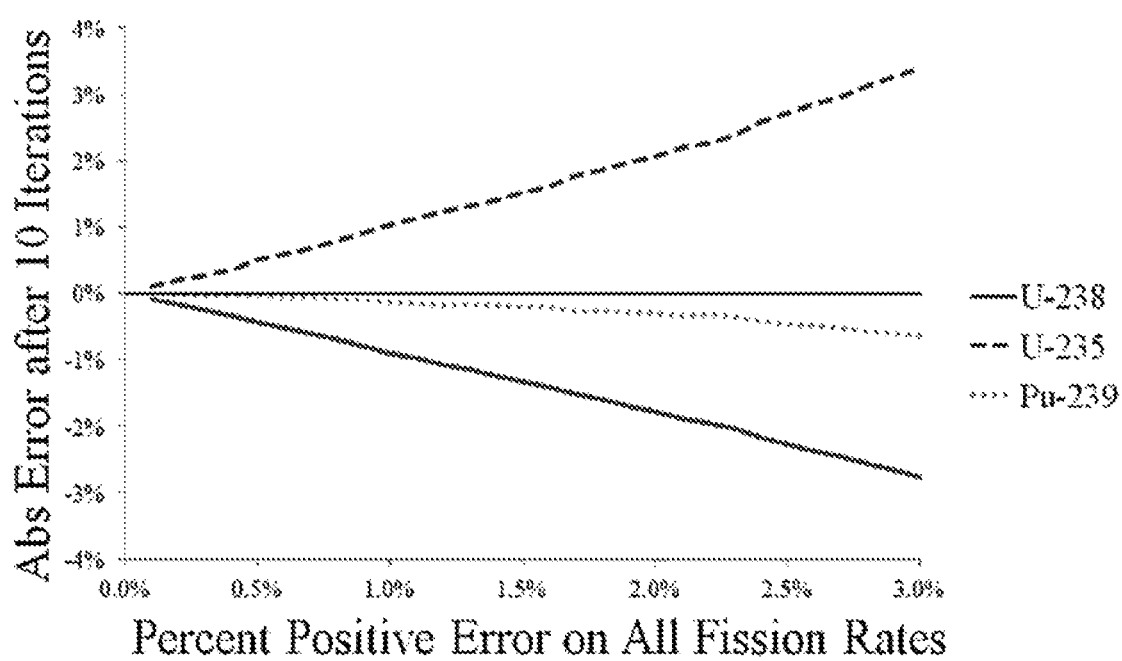
FIG. 7 is a composite plot of the absolute error after 10 iterations for increasing error of the input fission rates when employing the algorithm, according to an embodiment of the invention.

The sensitivity of the isotopic composition calculated by the iterative method to the error on the input fission rates was probed by input errors of 0.1%-3.0% for 10 iteration runs. FIG. 5 show the results which indicate, as the uniform error of fission rates increases, the absolute error on each of the calculated output wt % increases at a predictable rate. The slope of the lines in FIG. 11 represents a linear sensitivity coefficient between the input fission rates and the output isotopic compositions. The isotope $^{235}$U is the most sensitive to errors in the input fission rate, displaying a sensitivity coefficient of nearly unity in this test.

All patents and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A method of assaying fissionable material, comprising:
   providing a material comprising at least one fissionable isotope;
   sequentially irradiating said material with a plurality of incident neutron energies from a plurality of different neutron sources;
   acquiring detected fission rates induced in said material at said plurality of incident neutron energies using at least one neutron detector;
   performing, by processing circuitry, a multispectral active neutron interrogation analysis (MANIA), where said detected fission rates are compared to calculated fission rates for isotopic compositions of at least one isotope by an iterative analysis using a system of linear equations, wherein an identity and a quantity of one or more of said at least one fissionable isotope in said material are determined based at least in part upon said comparison of said detected fission rates to said calculated fission rates; and
   providing, by said processing circuitry, an indication of said identity and quantity of said one or more fissionable isotope in said material.

2. The method of claim 1, wherein said plurality of different neutron sources comprises a D,D generator, a D,T generator, a radioisotope source, or a nuclear reactor.

3. The method of claim 1, wherein said at least one neutron detector comprises a $^4$He gas scintillation detector.

4. The method of claim 1, wherein said MANIA comprises:
   inputting a geometry of irradiation of said material;
   inputting said detected fission rates; and
   performing, by processing circuitry, an iterative calculation and comparison comprising:
   a) obtaining an anticipated fissionable isotope composition as a test fissionable isotope composition;
   b) calculating expected fission rates for said test fissionable isotope composition;
   c) comparing said expected fission rates and said detected fission rates;
   d) in response to said comparison,
      outputting said indication of said identity and quantity of said one or more fissionable isotope if said expected fission rates and said detected fission rates are within a defined threshold of each other, otherwise proceeding to step e);
   e) calculating effective fission cross-sections;
   f) updating said test fissionable isotope composition from said calculated effective fission cross-sections; and
   g) proceeding to step b) to calculate expected fission rates using said updated test fissionable isotope composition.

5. The method of claim 4, wherein said geometry of irradiation is constructed for use with a cargo container, a rail car, a nuclear waste stream container, a spent fuel cell, or a nuclear material enrichment sample container.

6. The method of claim 1, wherein said iterative analysis uses an iteratively updated Monte Carlo N-particle transport (MCNP) model.

7. The method of claim 6, wherein microscopic fission cross-sections for said MCNP model are iteratively updated in response to said expected fission rates and said detected fission rates not being within said defined threshold.

8. The method of claim 6, wherein said comparison is based upon a least squares solution.

9. The method of claim 1, wherein said identity and quantity of said one or more fissionable isotope are related to fission rates by said system of linear equations.

10. The method of claim 9, wherein said system of linear equations is defined by a matrix of microscopic fission cross-sections and flux.

11. The method of claim 1, wherein said calculated fission rates are determined based upon an anticipated fissionable isotope composition.

12. The method of claim 1, wherein said material is within a cargo container, a rail car, a nuclear waste stream container, a spent fuel cell, or a nuclear material enrichment sample container.

* * * * *